United States Patent
Ohlsen et al.

(10) Patent No.: US 6,924,058 B2
(45) Date of Patent: Aug. 2, 2005

(54) HYDRODYNAMIC TRANSPORT AND FLOW CHANNEL PASSAGEWAYS ASSOCIATED WITH FUEL CELL ELECTRODE STRUCTURES AND FUEL CELL ELECTRODE STACK ASSEMBLIES

(76) Inventors: Leroy J. Ohlsen, 1064, Gold Bar, WA (US) 98251; Jonathan C. Mallari, 1712 S. Dawson St., Seattle, WA (US) 98108; Chung M. Chan, 16627 Northrup Way, Bellevue, WA (US) 98008; Aaron M. Cooke, 1617 N. 48th St., Seattle, WA (US) 98103

(*) Notice: Subject to any disclaimer, the term of this patent is extended or adjusted under 35 U.S.C. 154(b) by 240 days.

(21) Appl. No.: 09/858,327

(22) Filed: May 15, 2001

(65) Prior Publication Data

US 2002/0028372 A1 Mar. 7, 2002

Related U.S. Application Data

(63) Continuation-in-part of application No. 09/715,830, filed on Nov. 17, 2000, now Pat. No. 6,641,948.
(60) Provisional application No. 60/200,866, filed on May 2, 2000, provisional application No. 60/189,205, filed on Mar. 14, 2000, and provisional application No. 60/166,372, filed on Nov. 17, 1999.

(51) Int. Cl.[7] ............................. H01M 8/02; H01M 4/86
(52) U.S. Cl. .......................................... 429/40; 429/44
(58) Field of Search ............................. 429/40, 41, 43, 429/44, 30, 38

(56) References Cited

U.S. PATENT DOCUMENTS

| | | | |
|---|---|---|---|
| 3,506,561 A | | 4/1970 | Ceasar ........................ 204/290 |
| 5,262,021 A | | 11/1993 | Lehmann et al. ........... 204/129 |
| 5,723,228 A | * | 3/1998 | Okamoto ..................... 429/12 |
| 5,874,182 A | * | 2/1999 | Wilkinson et al. ............ 429/30 |
| 6,413,671 B1 | * | 7/2002 | Mercuri et al. .......... 429/231.8 |
| 6,528,199 B1 | * | 3/2003 | Mercuri et al. ............... 429/40 |

FOREIGN PATENT DOCUMENTS

| | | | |
|---|---|---|---|
| DE | 19757320 | | 7/1999 |
| DE | 198 20 756 C1 | * | 11/1999 |
| FR | 2667728 | * | 4/1992 |
| RU | 2148878 | | 5/2000 |
| WO | WO 95/13869 | | 5/1995 |
| WO | WO 98/21777 | * | 5/1998 |
| WO | WO 00/45457 | | 8/2000 |
| WO | WO 00/69007 | | 11/2000 |

OTHER PUBLICATIONS

Kelly et al; Sep. 2000; No. XP–002196002; abstract; "A miniature methanol/air polymer electrolyte fuel cell"; Electrochemical and Solid State Letters; vol. 3, No. 9; pp. 407–409.

Kendall, DL; Jul. 1990; No. XP000223116; "A New Theory for the Anisotropic Etching of Silicon and Some Underdeveloped Chemical Micromachining Concepts"; p. 3604, Journal of Vacuum Science and Technology, vol. 8, No. 4.

* cited by examiner

Primary Examiner—Jonathan Crepeau
(74) Attorney, Agent, or Firm—Thomas E. Loop

(57) ABSTRACT

Hydrodynamic transport and flow channel passage structures associated with fuel cell electrode structures and fuel cell electrode stack assemblies, as well as to methods relating thereto, are disclosed. More specifically, the present invention is directed to a novel fluid delivery and removal channel passage structures integrally associated with electrode structures adapted for use within a fuel cell system. In one embodiment, the fluid delivery and removal channel passage structure comprises: a fluid delivery channel disposed across a first face of a silicon-based electrode structure; a fluid removal channel disposed across a second face of the silicon-based electrode structure (wherein the second face opposes the first face); and a porous bulk matrix fluid transport layer interposed between the fluid delivery channel and the fluid removal channel, wherein the porous bulk matrix fluid transport layer is adapted to hydrodynamically flow a gas or liquid therethrough, and wherein the porous bulk matrix fluid transport layer is in fluid communication with the fluid delivery and the fluid removal channels.

4 Claims, 3 Drawing Sheets

| | Flow Channel | | Porous Catalyst Region |
|---|---|---|---|
| | Silicon Substrate | | Methanol Barrier Layer |
| | | | Wafer Bonding Material |

HYDRODYNAMIC TRANSPORT AND FLOW CHANNEL PASSAGEWAYS ASSOCIATED WITH FUEL CELL ELECTRODE STRUCTURES AND FUEL CELL ELECTRODE STACK ASSEMBLIES

CROSS-REFERENCE TO RELATED APPLICATIONS

This application is a continuation-in-part of U.S. patent application Ser. No. 09/715,830 filed Nov. 17, 2000 now U.S. Pat. No. 6,641,948; which application claims priority to U.S. Provisional Patent Application No. 60/200,866 filed May 2, 2000; U.S. Provisional Patent Application No. 60/189,205 filed Mar. 14, 2000; and U.S. Provisional Patent Application No. 60/166,372 filed Nov. 17, 1999; all of which are incorporated herein by reference in their entireties. This application also claims the benefit of priority of U.S. patent application Ser. No. 09/839,787, now U.S. Pat. No. 6,720,105, entitled "Metallic Blocking Layers Integrally Associated With Fuel Cell Electrode Structures and Fuel Cell Stack Assemblies"; U.S. patent application Ser. No. 09/839,786 entitled "Silicon-Based Fuel Cell Electrode Structures and Fuel Cell Electrode Stack Assemblies"; and U.S. patent application Ser. No. 09/839,950, now abandoned entitled "Sol-Gel Derived Fuel Cell Electrode Structures and Fuel Cell Electrode Stack Assemblies"; all of which were filed on Apr. 19, 2001 and are all also incorporated herein by reference in their entireties.

TECHNICAL FIELD

The present invention relates generally to fuel cell systems and, more specifically, to (1) hydrodynamic transport and flow channel passage structures associated with fuel cell electrode structures and fuel cell electrode stack assemblies and (2) direct reactant/electrolyte liquid feed fuel cell systems.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than combustion. It does so by harnessing the electrons released from controlled oxidation-reduction reactions occurring on the surface of a catalyst. A fuel cell system can produce electricity continuously so long as fuel is supplied from an outside source.

In electrochemical fuel cell systems employing methanol as the fuel supplied to the anode (also commonly referred to as a "Direct Methanol Fuel Cell" (DMFC) system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air (supplied to the cathode) is likewise simultaneously reduced at the cathode. The ions (protons) formed at the anode migrate through the interposing electrolyte and combine with the oxygen at the cathode to form water. From a molecular perspective, the electrochemical reactions occurring within a direct methanol fuel cell (DMFC) system are as follows:

Anode:
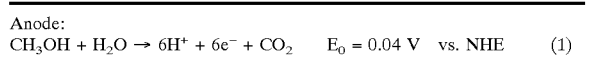

Cathode:

Net:

The various electrochemical reactions associated with other state-of-the-art fuel cell systems (e.g., hydrogen or carbonaceous fuel) are likewise well known to those of ordinary skill in the art of fuel cell technologies.

With respect to state-of-the-art fuel cell systems generally, several different configurations and structures have been contemplated—most of which are still undergoing further research and development. In this regard, existing fuel cell systems are typically classified based on one or more criteria, such as, for example, (1) the type of fuel and/or oxidant used by the system, (2) the type of electrolyte used in the electrode stack assembly, (3) the steady-state operating temperature of the electrode stack assembly, (4) whether the fuel is processed outside (external reforming) or inside (internal reforming) the electrode stack assembly, and (5) whether the reactants are fed to the cells by internal manifolds (direct feed) or external manifolds (indirect feed). In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Alkaline fuel cells (e.g., electrolyte is KOH);
2. Acid fuel cells (e.g., electrolyte is phosphoric acid);
3. Molten carbonate fuel cells (e.g., electrolyte is 63% $Li_2CO_3$/37% $K_2CO_3$);
4. Solid oxide fuel cells (e.g., electrolyte is yttria-stabilized zirconia);
5. Proton or ion exchange membrane fuel cells (e.g., electrolyte is NAFION).

Although these state-of-the-art fuel cell systems are known to have many diverse structural and operational characteristics, such conventional systems nevertheless share common characteristics with respect to their reactant delivery and reaction product removal systems. More specifically, conventional state-of-the art fuel cell systems have fluid transport and channel structures designed to predominantly transport reactants (i.e., a fuel and/or oxidant) via "passive diffusion" to the diffusion boundary layer associated with a catalytic film/layer that has been deposited on an electrode (positive or negative) structure. As is appreciated by those skilled in the art, the catalytic film/layer associated with conventional fuel cell electrodes is a substantially planar region where the electrochemical oxidation-reduction reactions between chemical species occur, and the diffusion boundary layer is the region very close to the electrode surface where, due to side-wall frictional forces, flow velocity tends to zero and mass transport by convection is necessarily negligible. In general, conventional fluid transport and channel structures that rely predominantly on a passive diffusion transport mechanism provide less than optimal mass transfer kinetics, especially in the context of direct liquid feed fuel cells.

As is appreciated by those skilled in the art, mass transfer in a electrochemical fuel cell (ie., the movement of material from one location to another) arises from differences in electrical and/or chemical potentials at separate locations, and/or from movement of a volume element of a fluid (gas or liquid). Accordingly, the modes of mass transfer are generally understood to be as follows: (1) migration, or the movement of a charged particle under the influence of an electric field such as an electrical potential gradient; (2) diffusion, or the movement of a species under the influence of a gradient of chemical potential such as a concentration gradient, and (3) convection, or fluid flow that occurs because of natural convection (ie., convection caused by density gradients) and/or because of forced convention (i.e., convection caused by hydrodynamic transport). All three modes of mass transfer may be present, to varying degrees, within existing electrochemical fuel cell systems.

As is further appreciated by those skilled in the art, most conventional DMFC systems generally consist of, among other things, a series of membrane electrodes assemblies (MEAs) configured into a stack, wherein each individual MEA further consists of a two opposing electrodes each having catalytic "active" regions. During operation, the catalytic active regions of such conventional MBAs are exposed, either directly or indirectly, to an adjacently flowing fluid stream (contained within an adjacently positioned fluid removal or delivery flow channel). Importantly, because the catalytic active regions of conventional fuel cell systems are substantially planar in character (e.g., a carbon-fiber sheet or layer having affixed or embedded catalyst particles), and because such active regions are positioned adjacent to a flowing fluid during operation (e.g., a fluid flowing in one or more parallel grooves machined into a graphite or aluminum block), the mass transport of reactants (especially gaseous reactants) to the outer boundary of the diffusion layer of the catalytically active electrode surface is predominantly "diffusion" mass transfer. Stated somewhat differently, incoming reactant fuel must laterally diffuse from diverse locations within a non-catalytically active porous region in order to reach a thin catalytically active proton exchange layer; byproducts of reaction must then laterally diffuse away from the proton exchange layer as they are simultaneously axially convected toward the outlet channel.

For purposes of example, at higher current densities, the poor performance characteristics of conventional DMFC systems have been attributed to diffusion mass transfer limitations associated with fuel and oxidant delivery.

In addition to the foregoing, several different configurations and structures have been contemplated for direct liquid feed fuel cell systems such as, for example, a direct methanol electrode structure having a solid polymer electrolyte (SPE). Because such polymer electrolytes are typically cast as solid membranes, this type of electrode assembly is commonly referred to as a "membrane electrode assembly" (MEA). A typical MEA consists essentially of a proton conducting membrane (i.e., the solid polymer electrolyte) sandwiched between two platinum coated electrode structures. A significant problem, however, with DMFC systems having MEAs is a phenomenon known as "methanol cross-over." methanol in conventional DMFC systems has a tendency to cross-over from the anode to the cathode via diffusion (i.e., it migrates through the electrolyte), where it adsorbs onto the cathode catalyst and reacts with oxygen from air resulting in a parasitic loss of methanol fuel and concomitant reduction in fuel cell voltage. Indeed, performance losses of 40–100 mV at a given current density have been observed at the cathode of DMFC systems utilizing a direct methanol feed (Potje-Kamloth et al., Abstract No. 105, Extended Abstracts 92–2, "Fall Meeting of the Electrochemical Society" (1992), Kuver et al., J Power Sources 52:77 (1994)).

Conventional attempts for reducing methanol cross-over in DMFC systems having MEAs include structural modifications of the central solid polymer membrane. Exemplary in this regard are the MEAs disclosed in (1) U.S. Pat. No. 4,664,761 to Zupancic et al. (discloses proton-conducting membrane made of an interpenetrating polymer network); (2) U.S. Pat. No. 5,672,438 to Banarjee et al. (discloses proton-conducting laminated membrane); and (3) U.S. Pat. No. 5,919,583 to Grot et al (discloses proton-conducting membrane that includes an inorganic filler). Although the various MEA designs disclosed in these patents are able to reduce methanol cross-over to some degree, they nevertheless still have relatively high methanol permeabilities.

Other attempts for reducing methanol cross-over include the incorporation of a metallic barrier layer into the electrode assembly. Exemplary in this regard are the metal hydride barrier layers disclosed in (1) Pu et al., "A Methanol Impermeable Proton Conducting Composite Electrolyte System," J Electrochem. Soc., 142(7):119–120 (July 1995) (discloses a three-layered laminar electrolyte consisting of a palladium foil layer sandwiched between two polymeric electrolytes); (2) U.S. Pat. No. 5,759,712 to Hockaday (discloses a semi-permeable plastic electrode structure having a top palladium membrane that contains numerous swellable voids); and (3) U.S. Pat. No. 5,846,669 to Smotkin et al. (discloses a hybrid electrolyte system consisting of an acid electrolyte, a base electrolyte, and an interposing palladium foil layer). Although the various MEA designs disclosed in these patents are better able to reduce methanol cross-over than other conventional designs, they too are also less than optimal because of problems caused by the poor ability of such foils to tolerate mechanical stresses (from hydration cycling effects). In short, these state-of-the-art hydrogen permeable metallic blocking layers are known to experience significant problems with cracking and/or delamination.

Although significant progress has been made with respect to these and other fuel cell system problems, there is still a need in the art for improved fluid transport and flow channel passageways associated with fuel cell electrode structures and fuel cell electrode stack assemblies, as well as improved direct liquid feed fuel cell systems. The present invention fulfills these needs and provides for further related advantages.

SUMMARY OF THE INVENTION

In brief, the present invention relates generally to fuel cell systems and, more specifically, to hydrodynamic transport and flow channel passage structures associated with fuel cell electrode structures and fuel cell electrode stack assemblies, as well as to methods relating thereto. In one embodiment, the present invention is directed to a fluid delivery and removal channel passage structure integrally associated with an electrode structure (e.g., anode) of a fuel cell system. The fluid delivery and removal channel passage structure comprises: a fluid delivery channel disposed across a first face of the electrode structure; a fluid removal channel disposed across a second face of the electrode structure, wherein the second face opposes the first face; and a porous bulk matrix fluid transport layer interposed between the fluid delivery channel and the fluid removal channel, wherein the porous bulk matrix fluid transport layer is adapted to hydrodynamically flow a gas or liquid therethrough, and wherein the porous bulk matrix fluid transport layer is in fluid communication with the fluid delivery and the fluid removal channels.

In another embodiment, the present invention is directed to a fluid delivery and removal channel passage structure associated with an electrode structure (e.g., cathode) of a fuel cell system, characterized in that the fluid delivery and removal passage structure comprises an inlet passage and an outlet passage separated by a porous bulk matrix fluid transport layer, wherein the porous bulk matrix fluid transport layer is adapted to hydrodynamically flow a gas or liquid therethrough, and wherein the porous bulk matrix fluid transport layer is in fluid communication with the inlet passage and the outlet passage.

In still another embodiment, the present invention is directed to a fluid transport passageway structure integrally associated and in combination with a bi-polar electrode plate assembly of a fuel cell system, characterized in that bi-polar electrode plate assembly comprises an anodic electrode structure bonded together with an opposing cathodic electrode structure. In this embodiment, the anodic electrode structure comprises: one or more anodic fluid delivery channels positioned on a first side of the anodic electrode structure; one or more anodic fluid removal channels positioned on a second side of the anodic electrode structure, wherein the second side is substantially parallel to the first side of the anodic electrode structure; and one or more porous bulk matrix anodic fluid transport regions, wherein each porous bulk matrix anodic fluid transport region is positioned in between at least (i) one of the one or more anodic fluid delivery channels, and (ii) one of the one or more anodic fluid removal channels, and wherein each porous bulk matrix anodic fluid transport region is in fluidic communication with at least one of the one or more anodic fluid delivery channels and at least one of the one or more anodic fluid removal channels. Moreover, and in this embodiment, the cathodic electrode assembly comprises at least one porous bulk matrix cathodic fluid transport region in fluidic communication with an inlet passage and an outlet passage, wherein the porous bulk matrix cathodic fluid transport region is adapted to hydrodynamically flow a gas or liquid therethrough, and wherein the porous bulk cathodic matrix fluid transport region is in fluid communication with the inlet passage and the outlet passage.

The present invention also relates to metallic blocking layers integrally associated with fuel cell electrode structures and fuel cell electrode stack assemblies, as well as to methods relating thereto. In one embodiment, the present invention is directed to a metallic blocking layer integrally associated with an electrode structure of a fuel cell system such as, for example, a direct methanol fuel cell system. In this embodiment, the invention may be characterized in that the electrode structure comprises an inorganic (i.e., noncarbonaceous) support substrate having one or more discrete porous regions, wherein the one or more discrete porous regions is defined by an array of acicular pores disposed across the top surface area of the electrode structure such that at least a portion of the blocking layer covers the top surface area and protrudes into the array of acicular pores. The blocking layer is preferably a substantially voidless metallic membrane that is substantially impermeable to at least methanol and is substantially permeable to hydrogen atoms.

In yet another embodiment, the present invention is directed to an electrode assembly adapted for use with a fuel cell system. In this embodiment, the electrode assembly comprises an anode and an opposing cathode. More specifically, the cathode includes one or more discrete cathode porous regions, wherein the one or more discrete cathode porous regions is defined by an array of interconnected acicular pores, and wherein a top surface of the cathode has thereon a metallic blocking layer defined by a metallic membrane that is substantially impermeable to at least methanol and is substantially permeable to hydrogen atoms. In contrast, the anode includes one or more discrete anode porous regions, wherein the one or more discrete anode porous regions is defined by an array of anodic acicular pores. The anode and the cathode are spaced apart and substantially parallel to each other so as to define a spaced apart region that is adjacent to the metallic blocking layer. The spaced apart region may also be adapted to flow therethrough an electrolyte/reactant fluid stream.

In yet another embodiment, the present invention is directed to a metallic blocking layer in combination with an inorganic electrode structure of a fuel cell system. In this embodiment, the inorganic electrode structure comprises a bulk matrix having a plurality of acicular pores that extend into the bulk matrix from a top surface. The metallic blocking layer resides on the top surface and partially extends into the plurality of acicular pores. The metallic blocking layer may comprise or consist essentially of a central transition metal diffusion layer (such as, for example, vanadium) having palladium reaction layers on either side.

The present invention also further relates to silicon electrode structures and silicon electrode assemblies associated with fuel cell systems, as well as to methods relating thereto. In one embodiment, the present invention is directed to an electrode structure adapted for use with a fuel cell system such as, for example, a direct methanol fuel cell system. In this embodiment, the invention may be characterized in that the electrode structure comprises a silicon substrate having one or more selectively doped regions thereon, wherein each of the one or more selectively doped regions is adapted to function as a current collector for the transmission of an electrical current.

In another embodiment, the present invention is directed to an electrode structure that comprises a silicon substrate having one or more discrete porous bulk matrix regions disposed across a top surface, wherein each of the one or more discrete bulk matrix porous regions is defined by a plurality of pores that extend into the silicon substrate, wherein the plurality of pores define inner pore surfaces, and wherein the inner pores surfaces have catalyst particles uniformly dispersed thereon. The inner pore surface may also have thereon an interposing layer of ruthenium dioxide (i.e., silicon/ruthenium dioxide layer/catalyst particles). In such embodiments, the ruthenium dioxide layer facilitates electron transport away from electrochemical active sites.

The present invention still further relates to sol-gel derived electrode structures and sol-gel derived electrode assemblies associated with fuel cell systems, as well as to methods relating thereto. In one embodiment, the present invention is directed to an electrode structure adapted for use with a fuel cell system such as, for example, a direct methanol fuel cell system. In this embodiment, the invention may be characterized in that the electrode structure comprises a support substrate or structure having a one or more discrete porous regions, wherein each of the one or more discrete porous regions comprise a sol-gel. The sol-gel of the present invention may comprise platinum ruthenium dioxide, platinum-ruthenium-silicon oxide, platinum-ruthenium-titanium oxide, platinum-ruthenium-zirconium oxide, platinum-ruthenium-aluminum oxide, or a combination thereof; preferably, however, the sol-gel comprises platinum ruthenium dioxide.

In still yet another embodiment, the present invention is directed to a fuel cell system that comprises: a porous anode structure; a porous cathode structure; and a liquid fuel and electrolyte mixture that ionically connects the anode to the cathode; wherein the anode structure and the cathode structure are spaced apart and substantially parallel to each other so as to define a spaced apart region, and wherein the liquid fuel and electrolyte mixture is interposed between the anode structure and the cathode structure and within the spaced apart region, and wherein the porous anode structure is in fluid communication with the spaced apart region and is adapted to flow the liquid fuel and electrolyte mixture therethrough, and wherein the porous anode structure has inner pore surfaces that have (i) a catalyst uniformly deposited thereon, and (ii) a polymeric catalyst uniformly deposited thereon.

These and other aspects of the present invention will become more evident upon reference to following detailed description and attached drawings. It is to be understood, however, that various changes, alterations, and substitutions may be made to the disclosure contained herein without departing from the spirit and scope of the present invention. It is to be further understood that the drawings are illustrative (hence, not necessarily to scale) and symbolic representations of exemplary embodiments of the present invention.

DETAILED DESCRIPTION OF THE INVENTION

In a first aspect, the present invention is directed to hydrodynamic transport and flow channel passage structures integrally associated with fuel cell electrode structures and fuel cell electrode stack assemblies, as well as to methods relating thereto. The novel hydrodynamic transport and flow channel passage structures disclosed herein advantageously allows reactants and/or oxidants to reach the diffusion layer of the catalytic active regions of fuel cell electrode structures predominantly by a forced convection mass transfer mechanism (as opposed to a diffusion mass transfer mechanism), which is achieved by flowing a fluid reactant/electrolyte (1) through a catalytically active bulk matrix (i.e., a volumetric region of the fuel cell electrode where the electrochemical oxidation-reduction reactions between chemical species take place) and (2) immediately adjacent to both the anode structure and cathode structure of an electrode assembly (both of which comprise a polymeric electrolyte coating on their respective pore surfaces). In such a configuration, the flowing fluid reactant/electrolyte ionically connects the anode structure to the cathode structure. In the context of the present invention, suitable fluid reactant/electrolytes include, for example, an organic liquid fuel combined with an acid solution (i.e., a liquid aprotic organic electrolyte). Exemplary organic fuels comprise water and an alcohol such as ethanol, propanol, methanol, or a combination thereof; and the acid solution may be phosphoric acid, sulfuric acid, trifluoromethane sulfonic acid, or a combination thereof. In some embodiments, the fluid reactant/electrolyte may be equal molar amounts of methanol and water together with an acid in an amount of about 0.01 to 3.0 M, and preferably in an amount of about 0.25 M.

In view of the foregoing and in one embodiment, the present invention is directed to a hydrodynamic transport passageway structure integrally associated and in combination with an electrode structure of a fuel cell system. In other embodiments, the present invention is directed to a fluid delivery and removal channel passage structures associated with an electrode assembly of a fuel cell system. In general, the novel fluid passage structures of the present invention comprise a porous bulk matrix fluid transport layer that is defined by a substrate having an array of interconnected linear acicular pores. In still other embodiments, the present invention is directed to various electrode stack assemblies and fuel cell systems having novel fluidic transport and flow channel passageways. Although these and other specific details of certain embodiments of the present invention are set forth in the following detailed description and accompanying drawings, those skilled in the art will recognize that the invention may have additional embodiments, or that the invention may be practiced without several of the details described herein.

Figure 1:
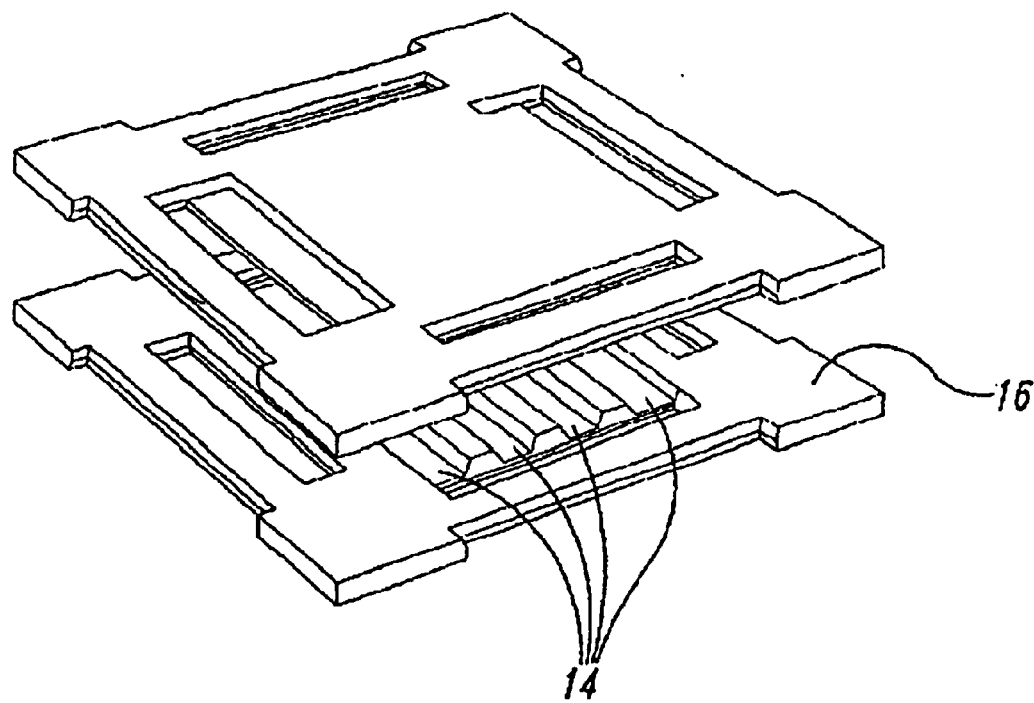
FIG. 1 illustrates a top exploded isometric view of a hydrodynamic transport structure integrally associated with an electrode assembly of a fuel cell system in accordance with an embodiment of the present invention.
Figure 2:
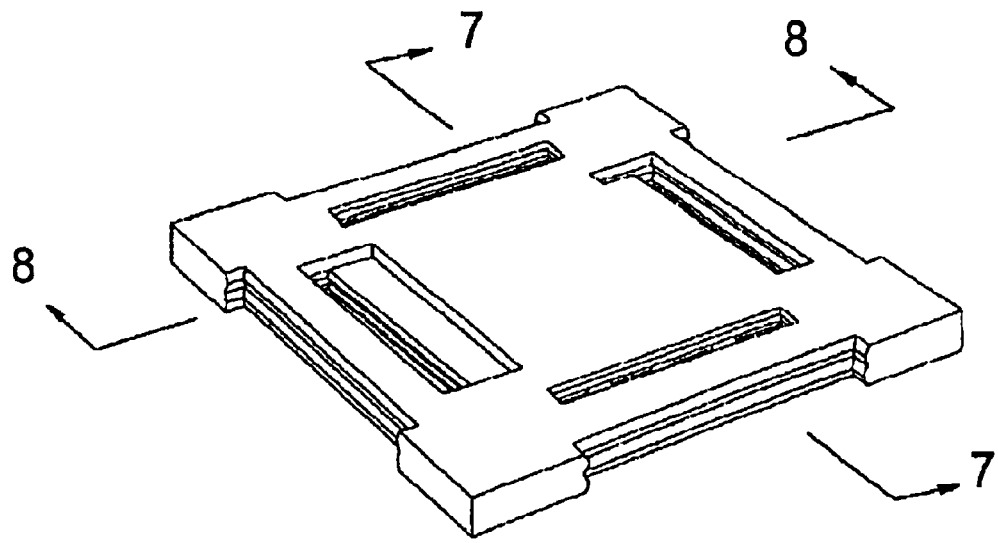
FIG. 2 illustrates a top isometric view of the hydrodynamic transport structure integrally associated with the electrode assembly of FIG. 1.
Figure 3:
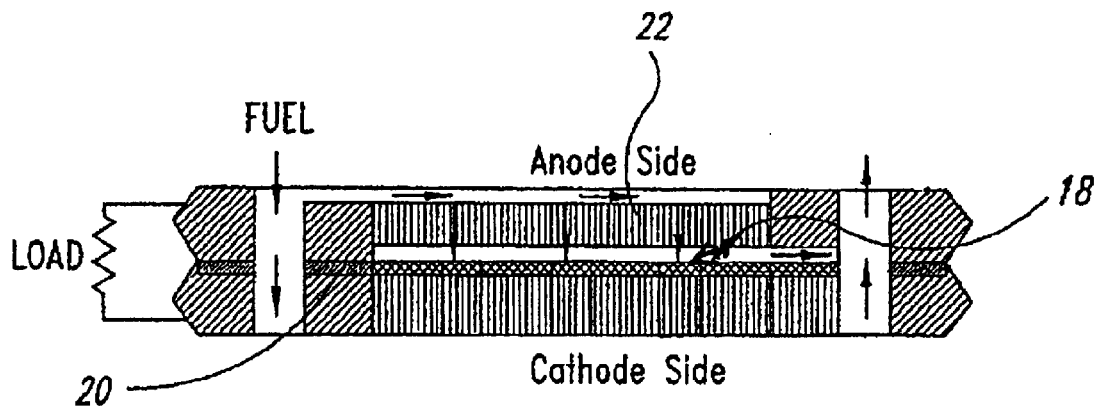
FIG. 3 illustrates a side cross-sectional view taken along line 7—7 of the hydrodynamic transport structure of FIG. 2.
Figure 4:
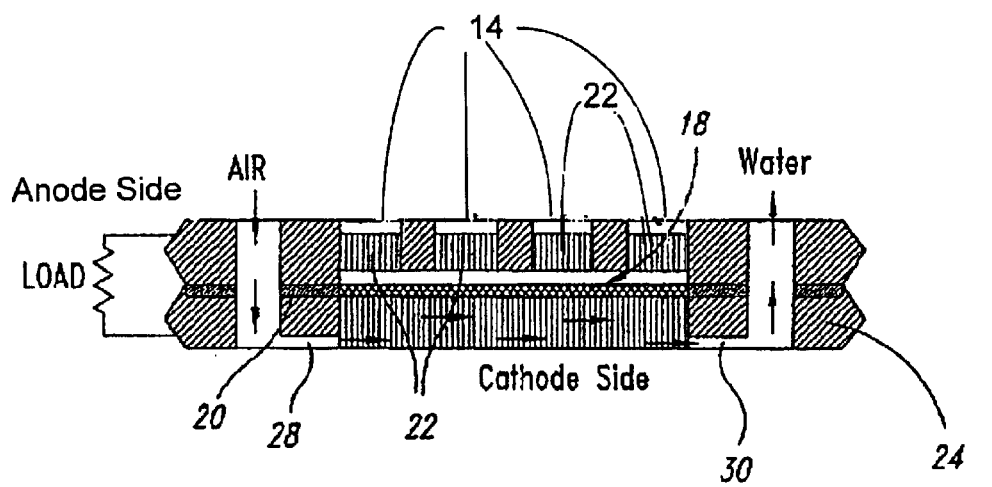
FIG. 4 illustrates a side cross-sectional view taken along line 4—4 of the hydrodynamic transport structure of FIG. 2.
Figure 5:
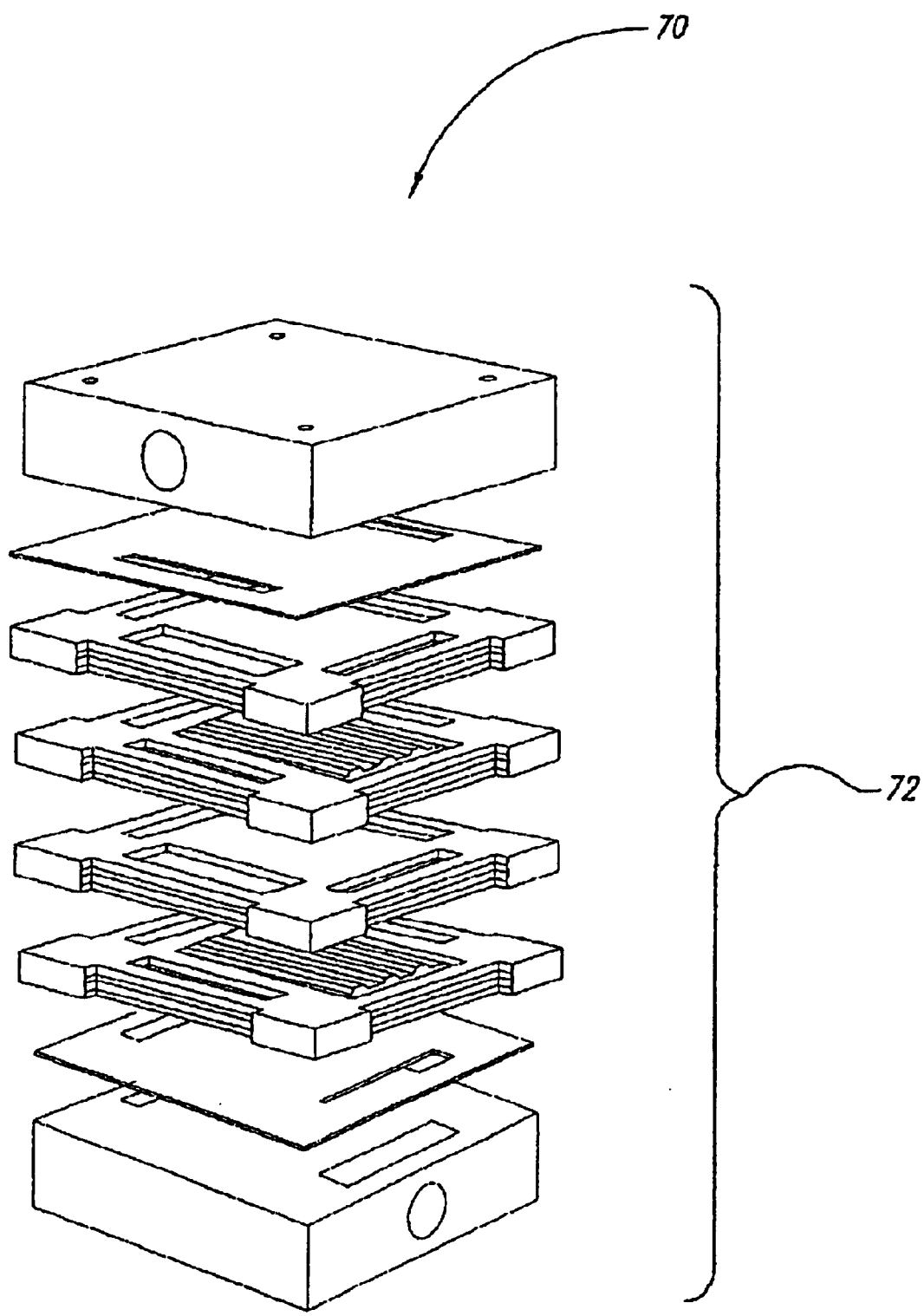
FIG. 5 illustrates an exploded top isometric view of fluid transport and flow channel passageways associated with a fuel cell electrode stack assembly in accordance with an embodiment of the present invention.

Thus, and with reference to FIGS. 1–5, the present invention is directed to a fluid delivery and removal channel passage structure integrally associated with an electrode structure 12 of a fuel cell system (not shown) such as, for example, (1) an anode of a bi-polar electrode plate assembly and (2) a cathode of a bi-polar electrode plate assembly. The fluid delivery and removal channel passage structure comprises four fluid delivery channels 14 disposed across a first face 16 of the electrode structure 12. The fluid delivery channels 14 each preferably have dimensions of 10,000 $\mu$m (L)×1,000 $\mu$m (W)×100 $\mu$m (T). The fluid delivery and removal channel passage structure comprises an inlet port 28 and an outlet port 30 separated by a single porous bulk matrix fluid transport layer 32, wherein the porous bulk matrix fluid transport layer 32 is preferably defined by an array of interconnected linear acicular pores, and wherein the inlet and outlet ports 28, 30 are each adapted to transport fluid in a direction perpendicular to the longitudinal axes of the acicular pores. The porous bulk matrix fluid transport layer 32 preferably has dimensions of 10,000 $\mu$m (L)×10,000 $\mu$m (W)×100 $\mu$m (T).

As illustrated the fluid delivery and removal channel passage structure also comprises at least one fluid removal channel 18 disposed across a second face 20 of the electrode structure 12 (wherein the second face parallely opposes the first face). The fluid removal channel 18 preferably has dimensions of 10,000 $\mu$m (L)×10,000 $\mu$m (W)×100 $\mu$m (T). The fluid removal channel 18 communicates with each of the fluid delivery channels 14 by way of four interposing porous bulk matrix fluid transport layers 22. The four interposing porous bulk matrix fluid transport layers 22 may be, for example, (1) an array of interconnecting linear acicular pores formed by selective anodic polarization of a silicon wafer in hydrofluoric acid (as described in further detail below), and/or (2) an interconnecting porous matrix structure formed by the selective growth of a metal oxo polymer (as also described in further detail below).

Preferably, however, the bulk matrix fluid transport layers of the present invention comprise interconnecting linear acicular pores, wherein each of the interconnected linear acicular pores are perpendicularly aligned with respect to each of the four fluid delivery channels 14 and the single fluid removal channel 18. In this configuration, the porous bulk matrix fluid transport layers 22 are each adapted to hydrodynamically flow a gas or liquid therethrough; hence, they are understood to be in fluid communication with each respective fluid delivery channel 14 and the fluid removal channel 18.

In addition to the above-disclosed fluid delivery and removal channel structures (integrally associated with fuel cell electrode structures), the present invention is also directed to fuel cell electrode assemblies that comprise an anode structure in combination with a cathode structure, wherein such a configuration allows a flowing reactant/oxidant/electrolyte fluid to ionically connect the anode to the cathode. Accordingly, the present invention is further directed to a fluid transport passageway structure integrally associated and in combination with a bi-polar electrode plate assembly of a fuel cell system. The fluid transport passageway structure may be characterized in that the bi-polar electrode plate assembly comprises an anodic electrode structure bonded together with an opposing cathodic electrode structure.

In such a bi-polar plate assembly embodiment, the anodic electrode structure preferably comprises: (i) one or more anodic fluid delivery channels 14 positioned on a first side 16 of the anodic electrode structure 12; (ii) one or more anodic fluid removal channels (hidden) positioned on a second side of the anodic electrode structure, wherein the second side is substantially parallel to the first side of the anodic electrode structure; and (iii) one or more porous bulk matrix anodic fluid transport regions 22, wherein each porous bulk matrix anodic fluid transport region 22 is positioned in between at least (a) one of the one or more anodic fluid delivery channels 14, and (b) one of the one or more cathodic fluid removal channels (hidden), and wherein each porous bulk matrix anodic fluid transport region 22 is in fluidic communication with at least one of the one or more anodic fluid delivery channels 14 and at least one of the one or more anodic fluid removal channels (hidden). In contrast, the cathodic electrode structure 24 comprises at least one porous bulk matrix cathodic fluid transport region (not shown) in fluidic communication with an inlet passage and an outlet passage (not shown).

The present invention is still further directed to fluid transport and flow channel passageway structures 70 associated with a fuel cell electrode stack assembly 72 (shown in exploded view). In this embodiment, the fuel cell electrode stack assembly comprises: (i) a first end cap assembly having a first fluid inlet port and second fluid outlet port; (ii) a second end cap assembly having a third fluid inlet port and a fourth fluid outlet port; and (iii) a plurality of bi-polar electrode plate assemblies interposed between the first and second end cap assemblies, wherein each of the bi-polar plate assemblies comprises an anodic electrode structure bonded together with an opposing cathodic electrode structure.

In the several embodiments set forth herein, the inventive hydrodynamic transport and flow channel passage structures are based, in large part, on novel substrates and support structures that are particularly useful for carrying a catalyst within a bulk fluid flow-through matrix. In this regard, the substrates and support structures disclosed herein principally include silicon substrates, sol-gel derived support structures, and combinations thereof. In particular, it has been discovered that these types of substrates and/or support structures are useful as electrode structures for a fuel cell system (especially for micro-scale direct methanol fuel cell system), mainly because such substrates and/or support structures are able to provide a high surface area to bulk volume ratio, have good mechanical strength, are compatible with thin/thick films which are often needed for making selected electrical connections, and are amenable to the formation of various flow channel structures. Because of these physical characteristics, among others, and because such substrates and/or support structures are also amenable to semiconductor micro-fabrication techniques, the (1) direct liquid feed fuel cell systems and (2) hydrodynamic transport and flow channel passage structures of the present invention may be manufactured by micromachining fabrication techniques associated with integrated circuit (IC) and semiconductor processing.

Accordingly, and without limitation to any particular methodology, the novel channel and porous flow-through regions associated with the electrode structures disclosed herein may be made by utilizing one or more processing techniques such as, for example, alkaline etching, plasma etching, lithography, electroplating, as well as electrochemical pore formation on silicon substrates. In this way, a silicon substrate useful for carrying a catalyst within a bulk fluid flow-through matrix (having one or more fluid delivery/removal channels) may be produced. The bulk fluid flow-through matrix may have any number of pores and pore sizes such as, for example, random and ordered pore arrays—including pore arrays having selected pore diameters, depths, and distances relative to one another. Similarly, the novel sol-gel derived support structures may be made by conventional sol-gel processing techniques, wherein the sol-gel derived support structures may have any number of pores, pore sizes, and/or pore structures. In short, the present invention is inclusive of all silicon substrates and sol-gel derived support structures, including combinations thereof, that have any number of possible porosities and/or void spaces associated therewith (as long as such structures allow for hydrodynamic fluid transport).

In view of the foregoing, an aspect of the present invention relates to the use of a silicon substrate (e.g., a silicon wafer) as a support structure for carrying a catalyst, wherein the silicon substrate together with the catalyst serves as a flow-through hydrodynamic electrode structure (e.g., a porous bulk matrix fluid transport layer or region) of a fuel cell system. Thus, and in one aspect, the present invention is directed to a silicon-based electrode structure having integrally associated therewith a fluid delivery and removal passage structure. In this regard, porous silicon substrates (and/or support structures) may be formed by silicon micromachining and/or wet chemical techniques (employed by the semiconductor industry) such as, for example, anodic polarization of silicon in hydrofluoric acid. As is appreciated by those skilled in the art of silicon anodic etching, the anodic polarization of silicon in hydrofluoric acid (HF) is a chemical dissolution technique and is generally referred to as HF anodic etching; this technique has been used in the semiconductor industry for wafer thinning, polishing, and the manufacture of porous silicon films that a wide variety of thicknesses. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12):588–589 (1990)). Accordingly, and based on these methods, an aspect of the present invention relates to forming a porous silicon having an engineered morphology. In the context of the present invention, it is to be understood that the porous silicon layer may be nanoporous silicon (i.e., average pore size <2 nm), mesoporous silicon (i.e., average pore size of 2 nm to 50 nm), or macroporous silicon (i.e., average pore size >50 nm).

More specifically, porous silicon substrates useful in the context of the present invention may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science*, 65/66:408–414 (1993); M. J. Eddowes, "Photoelectrochemical Etching of Three-Dimensional Structures in Silicon," *J of Electrochem. Soc.*, 137(11):3514–3516 (1990).) An advantage of this relatively more sophisticated technique over others is that it is largely independent of the different principal crystallographic planes associated with single-crystal silicon wafers (whereas most anisotropic wet chemical etching methods have differences in rates of etching along the different principal crystallographic planes). The photo-electrochemical HF anodic etching of n-type silicon, for example, depends upon, among other things, the existence of holes (h$^+$) at or near the silicon surface/solution interface. As is appreciated by those skilled in the art of silicon anodic etching, such holes may be generated by illumination of the silicon surface (n-type); and the holes' transport or flux to the silicon/solution interface may be controlled by an applied potential bias (together with its associated electric field). Once at or near the silicon/solution interface, the photo-generated holes may take part in oxidation-reduction reactions with surface atoms. In a suitable electrolyte HF solution, oxidation-reduction will be followed by dissolution of the oxidation product such that etching will proceed. (Note that for p-type silicon, holes are readily available so there is generally no need for photo-illumination.)

Several chemical oxidation-dissolution models have been reported to explain the reaction mechanism that occurs during the electrochemical HF anodic etching of silicon. Perhaps, the most popular model is the one proposed by Lehmann and Gosele. (Lehmann et al., "Porous Silicon Formation: A Quantum Wire Effect," *Applied Physics Letter*, 58(8)856–858 (1991)). The mechanism proposed by Lehmann and Gosele is schematically depicted below in chemical equation (4).

(4)

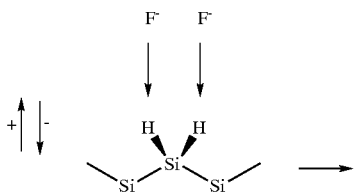

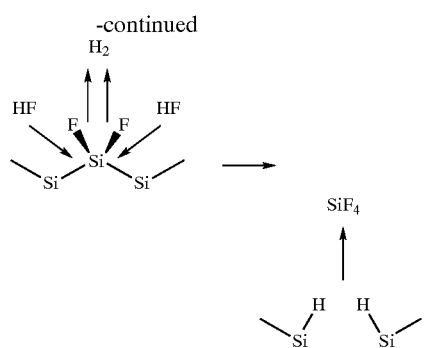

According to the Lehmann and Gosele model as represented by chemical equation (4), silicon, when immersed in a HF solution, will form a Si—H bond on the surface. The holes and their transport to or near the silicon surface/solution interface (caused by supplying a voltage together UV illumination for n-type silicon) reduces the strength of the Si—H bonds thereby allowing formation of Si—F$_2$, which, in turn, results in a weakening of the Si—Si bonds. Hydrofluoric acid form the solution then causes the weakened Si—Si bond to break, thereby causing the formation of SiF$_4$, which, in turn, goes into the surrounding solution.

In order to form porous silicon substrates by a photoelectrochemical HF anodic etching technique as described above, it is necessary to either obtain or construct an anodic etching cell. In this regard, a suitable anodic etching cell may be obtained commercially from Advanced Micromachining Tools GmbH (Frankenthal, Germany); alternatively, an appropriate anodic etching cell may be constructed.

As previously noted, another aspect of the present invention relates to the use of a sol-gel derived support structure that is optionally carrying a catalyst, wherein the sol-gel derived support structure together with the optional catalyst serves as a flow-through hydrodynamic electrode of a fuel cell system. Thus, and in one aspect, the present invention is directed to a sol-gel derived electrode structure (optionally integrated together with a silicon substrate) having integrally associated therewith a fluid delivery and removal passage structure. As is appreciated by those skilled in the art of sol-gel chemistry, sol-gel processes are a way to make dispersed ceramic materials through the growth of metal oxo polymers in a solvent. (see, e.g., Brinker et al., "Sol-Gel Science, the Physics and Chemistry of Sol-Gel Processing," *Academic* (1990).) The chemistry associated with sol-gel processes is based on inorganic polymerization reactions. In this regard, metal oxo polymers useful in the context of the present invention may be obtained through hydrolysis and condensation of molecular precursors such as metal alkoxides M(OR)$_Z$ (wherein M=Si, Ti, Al, Zr, V, W, Ir, Mn, Mo, Re, Rh, Nb, Ni, Sr, Ba, Ta, Mg, Co; OR is an alkoxy group and Z is the valence or oxidation state of the metal) (Sanchez et al., "Inorganic and Organometallic Polymers with Special Properties," *Nato ASI Series* (Laine R. M., Ed.), 206:267 (1992)).

The metal oxo polymerization reaction proceeds first through the hydroxylation of metal alkoxides, which occurs upon the hydrolysis of alkoxy groups as follows:

$$M-OR+H_2O \rightarrow M-OH+ROH \tag{5}$$

The mechanism occurs in three steps: (a) nucleophilic attack of the metal M by the oxygen atom of a water molecule; (b) transfer of a proton from the water to an OR group of the metal; and (c) release of the resulting ROH molecule (Livage et al., "Sol-Gel Chemistry of Transition-Metal Oxides," *Progress in Solid State Chemistry*, 18(4):259–341 (1988)).

As soon as reactive hydroxy groups are generated, the formation of branched oligomers and polymers with a metal oxo based skeleton and reactive residual hydroxo and alkoxy groups occurs through a polycondensation process. Depending on experimental conditions, two competitive mechanisms have been described, namely, oxolation and olation.

Oxolation involves the formation of oxygen bridges as follows:

$$M\text{-}OH + M\text{-}OX \rightarrow M\text{-}O\text{-}M + XOH \quad (6)$$

(X=H or alkyl group)

As with hydrolysis, oxolation is a three step nucleophilic substitution reaction which occurs through the elimination of $H_2O$ or ROH. Generally, under a stoichiometric hydrolysis ratio (h=$H_2O$/M<2) the alcohol producing condensation is favored, whereas the water forming condensation is favored for larger hydrolysis ratio (h>>2) (Brinker et al., "Sol-Gel Science, the Physics and Chemistry of Sol-Gel Processing," *Academic* (1990)).

Olation, on the other hand, involves the formation of hydroxo bridges as follows:

$$M\text{-}OH + HO\text{-}M \rightarrow M\text{-}(OH)_2\text{-}M \quad (7)$$

Olation is a nucleophilic addition reaction that can take place when the coordination of the metallic center is not fully satisfied (N−Z>0). The hydroxo nucleophilic group enters the unsaturated coordination sphere of the metal. This reaction does not need the proton transfer described above (step b) and the removal of a leaving group (step c). Consequently, the kinetics of olation are usually faster than those of oxolation because steps b and c are not necessary (Sanchez et al., "Inorganic and Organometallic Polymers with Special Properties," *Nato ASI Series* (Laine R. M., Ed.), 206:267 (1992)).

In accordance with an aspect of the present invention, these three reactions (hydrolysis, oxolation and olation) may all be involved in the transformation of a metal alkoxide precursor into a metal oxo macromolecular network, where such a metal oxo macromolecular network is referred to herein as a sol-gel derived support structure. The exact structure and morphology of such a sol-gel derived support structure generally depends on the relative contribution of each of these reactions.

In exemplary embodiments of the present invention, a sol-gel derived support structure may be cast into etched or micromachined trenches, channels, and/or pits of a silicon substrate (e.g., a silicon wafer with selectively placed trenches), wherein the sol-gel derived support structure combined with the silicon substrate (together with the catalyst) serves as an electrode structure of a fuel cell system. In this context, exemplary sol recipes (chemicals are commercially available from Aldrich Chemical Company, Inc., Milwaukee, Wis.) useful in the practice of the present invention are as follows:

$Pt$—$RuO_2$

A platinum-ruthenium oxide precursor solution may be prepared by mixing dihydrogen hexahydroxyplatinate (IV) ($H_2Pt(OH)_6$), ruthenium(III) 2-4pentanedionate $Ru(C_5H_7O_2)_3$ with nitric acid ($HNO_3$), ethyl alcohol ($C_2H_5OH$), and de-ionized water. The solution may be refluxed under vigorous stirring at ~70° C. for ~2 hrs to yield a nominal molar ratio of 1:0.5:5:0.5 of: $Ru(C_5H_7O_2)_3$: $H_2Pt(OH)_6$: $H_2O$: $C_2H_5OH$: $HNO_3$.

$Pt$—$RuO_2$—$SiO_2$

A platinum-ruthenium-silicon oxide precursor solution may be prepared by first mixing hexachloroplatinic acid ($H_2PtCl_6$ x$H_2O$), ruthenium chloride hydrate ($RuCl_3$ X$H_2O$) and tetraethoxysilane ($Si(OC_2H_5)_4$) in ethyl alcohol ($C_2H_5OH$). A solution of ammonium hydroxide ($NH_4OH$) and de-ionized water may then added to the refluxing mixture under vigorous stirring at ~70° C. for ~2 hrs to yield a nominal molar ratio of 1:0.2:0.5:5:5:0.8 of $RuCl_3$ X$H_2O$: $Si(OC_2H_5)_4$: $H_2PtCl_6$ x$H_2O$ : $H_2O$ : $C_2H_5OH$: $NH_4H$.

$Pt$—$RuO_2$—$TiO_2$

A platinum-ruthenium-silicon oxide precursor solution may be prepared by first mixing dihydrogen hexahydroxyplatinate (IV) ($H_2Pt(OH)_6$) and ruthenium (III) 2-4pentanedionate $Ru(C_5H_7O_2)_3$ in ethyl alcohol, refluxed and stirred at ~70° C. for 3 hrs. Separately, titanium (IV) isopropoxide ($Ti[OCH(CH_3)_2]_4$) may also mixed with ethyl alcohol ($C_2H_5OH$), refluxed and stirred at ~70° C. for 3 hrs. Next, the two solutions may be mixed together, refluxed under stirring at ~70° C. for 3 hrs. Lastly, a solution of nitric acid ($HNO_3$) and de-ionized water may be added to the mixture, refluxed and stirred at ~70° C. for ~2 hrs to yield a nominal molar ratio of 1:0.2:0.5 : 5:5:0.5 of $Ru(C_5H_7O_2)_3$: $Ti[OCH(CH_3)_2]_4$: $H_2Pt(OH)_6$: $H_2O$: $C_2H_5OH$: $HN_{O3}$.

Analogous to the porous silicon support structures, the sol-gel derived support structures of the present invention may also have variable pore sizes and pore morphologies. For example, the pore size may be selectively adjusted by the incorporation of polystyrene latex particles (e.g., latex beads or microspheres) into the sol precursor solution. The latex particles useful for these purposes generally have average diameters ranging about from 0.05 to 10 μm. In addition, the sol-gel may also have a filler component such as, for example, sub-micron ruthenium oxide particles ranging from about 5 to 80 volume percent. (see generally, Velev and Kaler, *Adv. Mater.* 12(7):531–534 (2000); and Kulinowski et al., *Adv. Mater.* 12(11):833–838 (2000)). Moreover, and in accordance with certain preferred embodiments of the present invention, any of the above sols may be cast into etched or micromachined trenches, channels, and/ or pits of a silicon wafer, and more preferably, into an etched region of a porous silicon substrate. It has been found that the pores of a porous silicon substrate facilitates a mechanical interlocking mechanism for anchoring the sol-gel (thereby reducing the risk of delamination).

In yet another aspect of the present invention, an additional metallic oxide layer such as, for example, a 5–50 nm layer of ruthenium oxide deposited by chemical vapor deposition, may also improve the adhesion of the sol-gel to the underlying silicon substrate and provide an enhanced pathway for electron transport away from the active region of the electrode structure. Thus, the inner pore surface may have deposited thereon an interposing layer of ruthenium dioxide (i.e., silicon/ruthenium dioxide layer/catalyst particles).

Still another aspect of the present invention relates to a metallic catalyst carried on a silicon substrate and/or a sol-gel derived support structure, wherein the catalyst facilitates oxidation-reduction reactions of a fuel (e.g., hydrogen or methanol) or an oxidant (e.g., oxygen from air). In this regard, it is to be understood that the catalyst may be carried on the surface or face of a silicon substrate; and/or the catalyst may be carried on the pore surfaces (i.e., within the bulk matrix of the substrate or support structure) of either a porous silicon substrate or a sol-gel derived support structure (wherein the pore surfaces having catalyst particles thereon are also referred to herein as active regions).

Unlike traditional electrocatalyst deposition methods such as, for example, electroplating, sputtering and metal evaporation (which methods have all been used in conjunction with known fuel cell electrode structures; mainly to form substantially planar catalytic films or layers disposed across an electrode surface), the metallic catalyst aspect contemplates the use of surface organometallic chemistry techniques to form a metallic and/or bimetallic catalyst dispersion on or within a silicon substrate or sol-gel derived support structure (i.e., the active regions). The formation of such a metallic and/or bimetallic catalyst particles or noncontiguous layers by the use of surface organometallic chemistry techniques provides for an extremely efficient use of the catalyst (thereby resulting in significant cost savings), and allows for the dispersion of the catalyst throughout the bulk matrix of the substrate and/or support structure (thereby enhancing the oxidation-reactions occurring thereon).

In the context of direct methanol fuel cells, for example, it is known that platinum provides one of the best surfaces for the dissociative adsorption of methanol. However, at potentials required for methanol electrooxidation, the —C≡O intermediates formed during the complete oxidation process are relatively stable on the surface, and as a result they tend to poison the catalyst by blocking the adsorption sites. This tendency may be avoided, to some extent, by the addition of certain other metal additives so as to decrease the stability of the —C≡O on the surface (and in so doing, it is believed that such metal additives may facilitate the overall oxidation-reduction process). Thus, several mixed metal catalysts may be used (i.e., combinations of one or more noble metals) and are thus considered to be within the scope of the present invention; however, a bimetallic platinum:ruthenium catalyst is a particularly active bi-metallic catalyst and is therefore preferred (at least with respect to the anode).

As is appreciated by those skilled in the art of organometallic chemistry, the reaction of selected organometallic precursors with exposed surface atoms is one way to deposit or chemisorb a metallic catalyst. For example, the surface of a silicon substrate (including its pore surfaces) may be oxidized by exposure to air and water vapor at slightly elevated temperatures, thereby causing the surface to be covered with hydroxyl groups (Si—OH). These surface hydroxyl groups are active sites, and therefore may be used as the starting point for chemisorbing catalysts thereon via surface organometallic chemistry techniques. For example, the reaction of selected organometallic precursors with surface hydroxyl groups causes the chemisorption of surface supported molecular analogues thereof, which upon reduction gives rise to chemisorbed metallic nanoparticles having very small size distributions. Such methodologies are amenable to not only silicon surfaces, but are also well suited for deposition onto bulk oxides such as, for example, the various sol-gel derived support structures disclosed herein. For purposes of clarity, the terms "chemisorb" and "chemisorption" are to have meanings as understood by those skilled in the art of organometallic chemistry; and as such, these terms refer to molecules held to a surface by forces of the same general type as those occurring between bound atoms in molecules. Moreover, the heat evolved per mole of chemisorbed material is usually comparable to that evolved in chemical bonding, namely, about 100–500 kJ. (Laidler et al., "Physical Chemistry," Benjamin/Cummings Publishing Company, Inc. (1982).).

In an exemplary aspect of the present invention, a non-contiguous bi-metallic layer of platinum and ruthenium may be chemisorbed on and/or within a nonporous/porous silicon substrate by selective use of platinum and ruthenium precursors. For example, a silicon substrate may be immersed, under basic conditions (pH 8.5), into an aqueous ammonia solution of tetraamineplatinum(II) hydroxide hydrate, [Pt(NH$_3$)$_4$](OH)$_2$·xH$_2$O, (commercially available from Strem Chemicals, Inc., Newburyport, Me.) and stirred for a selected period of time, thereby causing formation of a platinum complex in accordance with chemical equation (8):

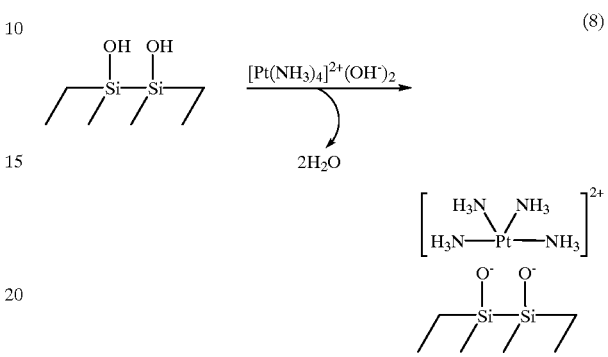

After washing with cold water, the silicon substrate may then be calcined in air to remove the remainder of the ligands from the platinum. This step may be done under a slow temperature ramp, 25–400° C., over a selected period of time, as is shown in chemical equation (9).

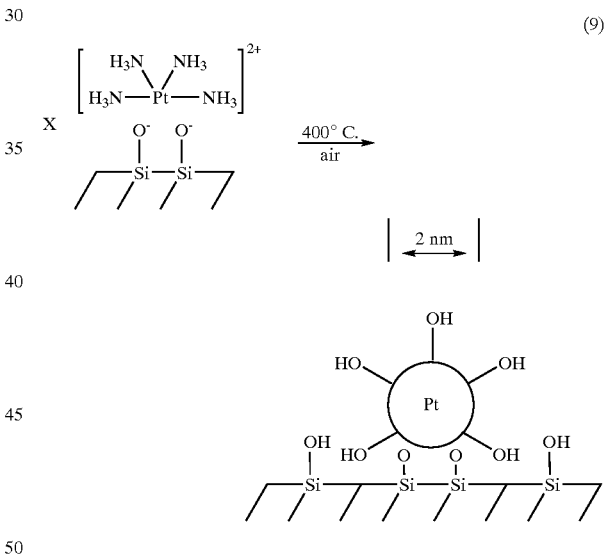

In general, the slower the temperature is increased, the smaller the size of the chemisorbed platinum particles (i.e., greater surface area, and narrower size distribution). (Humblot et al., "Surface Organometallic Chemistry on Metals: Formation of a Stable Sn(n-C4H9) Fragment as a Precursor of Surface Alloy Obtained by Stepwise Hydrogenolysis of Sn(n-C4H9)(4) on a Platinum Particle Supported on Silica," *J Am. Chem. Soc.*, 120(1):137–146 (1998); and Humblot et al., "Surface Organometallic Chemistry on Metals:Selective Dehydrogenation of Isobutane into Isobutene on Bimetallic Catalysts Prepared by Reaction of Tetra-n-Butyltin on Silica-Supported Platinum Catalyst," *J Catal.*, 179(2):458–468 (1998).).

Next, and after the silicon substrate has reached room temperature, it may then be immersed, under basic conditions (pH 8.5), into an aqueous ammonia solution of hexamineruthenium(III) chloride, [Ru(NH$_3$)$_6$]Cl$_3$ (commercially available from Strem Chemicals, Inc., Newburyport, Me.), and stirred for a selected period of time, thereby causing formation of a ruthenium complex in accordance with chemical equation (10).

(10)

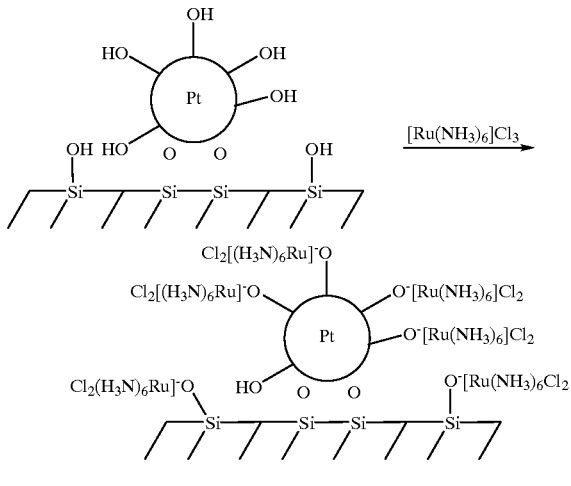

Finally, the catalyst may be reduced under flowing $H_2$ at 400° C. (1% in nitrogen) to form a mixed platinum ruthenium catalyst in accordance with chemical equation (11).

(11)

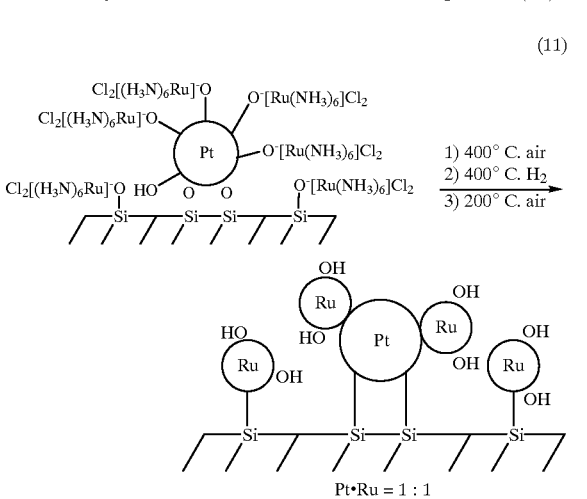

Furthermore, the previously described techniques are not limited to silicon substrates but can also be used for the deposition of catalyst onto the sol-gel derived support structures. For example, a ruthenium dioxide sol-gel substrate can be immersed in an aqueous ammonia solution of tetraamineplatinum(II) hydroxide hydrate as described above resulting in the formation of a surface bound platinum complex, equation (12).

(12)

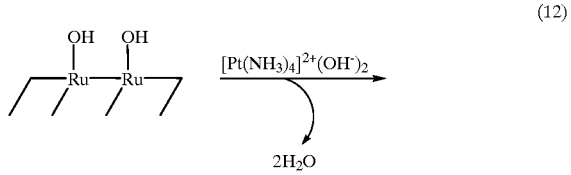

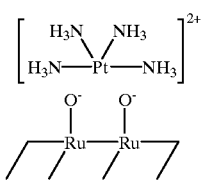

After washing with cold water, the ruthenium dioxide substrate may then be calcined in air to remove the remainder of the ligands from the platinum. This step may be done under a slow temperature ramp, 25° C. to 400° C., over a selected period of time. The catalyst may then be reduced under flowing $H_2$ at 400° C. (1% in nitrogen) to reduce the platinum followed by heating at 200° C. in air to ensure the surface of the ruthenium dioxide is fully oxidized, equation (13).

(13)

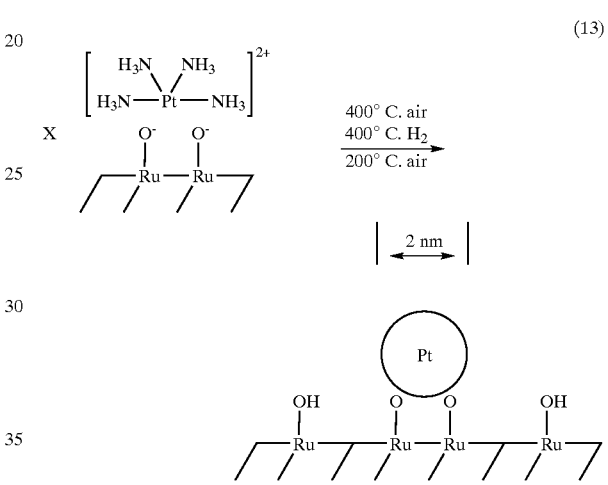

As noted above, the present invention is also directed to metallic blocking layers integrally associated with fuiel cell electrode structures and fuel cell electrode stack assemblies, as well as to methods relating thereto. In these embodiments, the electrode structures of the present invention are characterized in that they are generally made from an inorganic or noncarbonaceous substrate such as, for example, a silicon wafer, a sol-gel derived support structure, or a combination thereof. An important feature of these types of novel inorganic support substrates is that they may be manufactured so as to comprise a plurality of catalytic active porous regions (i.e., volumetric regions within the fuel cell electrode where the electrochemical oxidation-reduction reactions between chemical species take place). These volumetric active porous regions are extremely useful for obtaining relatively high power densities in miniature fuel cell systems, but only to the extent that problems associated with fuel cross-over are obviated. Unlike conventional graphite or plastic electrode support structures, the novel inorganic support substrates disclosed herein (1) are able to form an adhesion or fusion bonding layer (between the metallic blocking layer and the support substrate) that mitigates problems associated with delamination, and (2) are able to define an array of pores (e.g., a pattern of columns that extends into the inorganic bulk matrix) that provides an expansion route that mitigates problems associated with cracking. These improved physical characteristics are due, in large part, to the crystalline nature of the underlying inorganic substrates and support structures (whereby their crystalline nature makes them particularly amenable to forming fusion bonds with metals).

Thus, the present invention is directed to a palladium blocking layer integrally associated with an electrode structure 12 of a fuel cell system (not shown) such as, for example, a DMFC system. In this embodiment, the electrode structure comprises an inorganic (i.e., noncarbonaceous) support substrate having one or more discrete porous regions, wherein the one or more discrete porous regions is defined by an array of acicular pores disposed across the top surface area of the electrode structure such that at least a portion of the blocking layer covers the top surface area and protrudes into the array of acicular pores (note that the pores are preferably interconnected). As shown, the palladium blocking layer is a substantially voidless metallic palladium membrane, and the support substrate is porous silicon (e.g., a bulk silicon matrix having a plurality of acicular pores). Moreover, because of the crystalline nature associated with silicon and palladium, the support substrate may be fusion bonded together with the palladium blocking layer (optionally with an interposing metallic glue layer) such that the opposing crystalline lattices commingle.

Thus, and in view of the foregoing, an aspect of the present invention relates to the use of an inorganic support substrate support structure for carrying a metallic blocking layer thereon. Preferably, the inorganic support substrate is porous silicon, a sol-gel, or a silicon/sol-gel combination.

As further noted above, the inventive metallic blocking layer in combination with a silicon substrate and/or a sol-gel derived support structure, selectively allows for the transport of hydrogen atoms or protons while blocking substantially all other molecules. In particular, this aspect of the invention enjoys significant utility with respect to preventing "methanol cross-over," which phenomena commonly occurs in electrode assemblies of DMFC systems (wherein the methanol has a tendency to cross-over from the anode to the cathode). Without necessarily prescribing to any particular scientific theory, the hydrogen ion transport mechanism associated with direct liquid feed cell systems such as, for example, DMFC systems may be stated as follows:

1. Hydrogen ions diffuse via the electrolyte (polymeric or flowing reactant/electrolyte fluid) to the surface of the methanol barrier.
2. The hydrogen ions adsorb to the surface of the methanol barrier.
3. The hydrogen ions gain electrons from the metallic electron cloud and transfers from an adsorbed state on the surface to an absorbed state within the crystalline matrix of the methanol barrier.
4. The hydrogen ions diffuse through the crystalline matrix by jumping from interstitial site to interstitial site in a manner similar to the Brownian diffusion of molecules through a fluid.
5. The hydrogen ions reach the opposite surface, loses electrons to the electron cloud of the metallic film and changes from the absorbed state within the crystalline matrix to the adsorbed state on the surface.
6. The hydrogen ions desorb from the surface of the methanol barrier into the electrolyte (polymeric or flowing reactant/electrolyte fluid).
7. The hydrogen ions diffuse away from the methanol barrier via the electrolyte (polymeric or flowing reactant/electrolyte fluid).

The rate-limiting steps associated with such a transport mechanism are believed to be the electron transfer steps and the bulk diffusion step. In this regard, the diffusion of hydrogen through the crystalline matrix of the metallic blocking layer is referred to as the Bulk Diffusion step. The rate at which hydrogen diffuses through the matrix is largely controlled by the concentration gradient across the membrane, the thickness of the membrane, and the diffusion coefficient of the membrane as set forth below in the following equation (14):

$$N = \frac{D_T(C_{out} - C_{in})}{\delta} \quad (14)$$

wherein

| | | |
|---|---|---|
| N | Hydrogen flux through the membrane | $ccH_2/cm_2 \cdot sec$ |
| $D_T$ | Hydrogen diffusivity for a given membrane at a given temperature | $cm_2/sec$ |
| $C_{out}$ | Concentration of hydrogen in the membrane materials on the inlet side of the membrane | $ccH_2/ccMetal$ |
| $C_{in}$ | Concentration of hydrogen in the membrane material on the outlet side of the membrane | $ccH_2/ccMetal$ |
| $\delta$ | Thickness of the membrane | cm |

Accordingly, the greater the concentration difference between the inlet and outlet side of the membrane, the greater the hydrogen flux. In such a blocking system, the concentration at the inlet and outlet are generally affected only by the concentration of hydrogen ions in the electrolyte and the potential difference between electrolyte and membrane. Thus, the thinner the membrane, the greater the hydrogen flux. The diffusivity of the membrane is largely controlled by the membrane's composition and temperature (the diffusivity of the membrane increases with increasing operating temperature). Materials that typically have high rates of bulk diffusion include the noble metal palladium and the transition metals vanadium, niobium and tantalum (all of which are considered to be within the scope of the present invention).

The rate at which the electron transfer step proceeds is related to the total amount of surface area available for the electron transfer to occur, the suitability of the surface for the electron transfer reaction, and the temperature of the surface. (Metals that are particularly fast for electron transfer include platinum and palladium.) The electron transfer reaction generally only occurs at specific locations on the membrane surface. These reactions sites have a set density depending on how the surface of the membrane is prepared. The greater the surface area of the membrane the greater the total number of reactions sites where electron transfer can occur. In order to facilitate the electron transfer reactions, electrons from the metallic membrane need to be readily available. In order for this to occur, the surface of the membrane is preferably a metal with minimal adsorbed contaminants or oxide deposits. In general, increasing the temperature of the reaction system causes an increase of the rate at which the electron transfer reactions occur. In this regard, vanadium, niobium and tantalum all have bulk diffusion rates higher than that of palladium at similar temperatures; however, these metals all readily form layers of tightly bound oxides that greatly inhibit the electron transfer reaction. As a result, and although the bulk diffusion rate is greater in these metals, the actual rate of diffusion through these metals is much lower than a comparable palladium film under the same operating conditions.

In order to incorporate the high diffusion rates and relatively lower cost of the transition metals with the fast electron transfer reaction rate of palladium, a layered membrane structure may be formed in accordance with certain embodiments of the present invention. This structure generally comprises a central transition metal diffusion layer, such as vanadium, together with a thin palladium surface reaction layer on either side. Such a metallic membrane may be either be a solid self-supported metallic film, or it may be partially deposited into a porous matrix (e.g., porous silicon substrates and/or sol-gel derived support structures as disclosed herein).

In the context of the present invention, there are several different methods available for depositing a metallic membrane layer (depending on the material being deposited and the structure of the underlying substrate). In the case of a transition metal foil, no deposition process needs to occur as processing is simply a matter of preparing the surface in such a way so as to enhance the electron transfer reaction. Alternatively, when depositing the metallic layer onto a porous matrix, the metal needs to be deposited in such a way as to ensure intimate contact with the surrounding pore surfaces of the underlying bulk matrix. In this way, delamination and strain effects caused by crystal lattice expansion are minimized by virtue of there being a support matrix around the metal. Furthermore, because the metal membrane transcends the stretch of the porous cavity, the possibility of buckling of the film is minimized to only deflection when the film experiences the lateral stress induced by swelling of the film during proton (hydrogen) migration since it is supported by the surrounding porous walls. As is appreciated by those skilled in the art, a metallic film of palladium may be deposited on a silicon substrate and/or a sol-gel derived support structure by, for example, electroplating, physical vapor deposition, sputtering, thermal evaporation, e-beam evaporation, and electroless deposition, or a combination thereof.

As also noted above, an aspect of the present invention relates to the use of polymeric electrolytes on the pore surfaces of each electrode structure. In this regard, and in one aspect, the present invention relates to the impregnation of a polymer electrolyte into the porous silicon substrates and/or sol-gel derived support structures having a chemisorbed catalyst thereon so as to optimize the three-phase interface between catalyst, fuel and proton-conducting electrolyte. With respect to the polymer electrolyte associated with the various electrode assemblies disclosed herein, it may be a polymer ion-exchange membrane—generally of an acid type, such as, for example, a perfluorosulfonic acid membrane. Exemplary in this regard, are membranes known as NAFION (E. I. Du Pont de Nemours and Company, United States) which are, in general, electrochemically stable at temperatures up to about 100° C. These membranes have a polytetraflouoroethylene (PTFE) polymer chain as a backbone, several units (n=6–10) in length, with a flexible branch pendant to this chain, a perfluorinated vinyl polyether (m≧1) with a terminal acidic (sulfonic) group to provide the cation- (proton-) exchange capability. As an example, such an ionomer unit may have the following structure (equivalent weight about 1200):

(15)

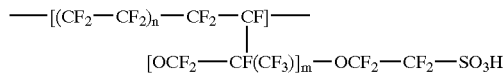

In general, membranes of this type have a high proton conductivity (>2 $\Omega^{-1} \cdot cm^{-2}$); the proton transport number is generally unity with a low electro-osmotic water transport rate (though the water content may be about 30%). The hydrogen and oxygen permeabilities are generally small: 3–5×10$^{-4}$ cm$^3$·cm/cm$^2$·h·atm at 25° C. Such a membrane is generally stable against chemical attack in strong bases, strong oxidizing and reducing acids, hydrogen peroxide, chlorine, etc., up to temperatures of 125° C. In the context of the present invention, the polymer electrolyte is preferably a perfluorosulfonic polymer membrane having a thickness ranging from about 20 to 200 microns.

As is appreciated by those skilled in the art, NAFION is available as a 5 weight percent solution in alcohols and water, which when applied to the electrodes disclosed herein may wet the surface and flow into the pores of the active regions. When dry, the polymer tends to stick to the internal surfaces but does not completely fill the channels, so that fuel will be able to infuse the structure and protons will be conducted across the cell. With a coating of the surfaces inside the porous structure, exceptional catalyst utilization and proton transport may be achieved.

For purposes of illustration and not limitation, the following examples more specifically disclose various aspects of the present invention.

EXAMPLES

Example 1

Silicon Substrate Electrodes

This example discloses the processing steps associated with making a silicon-based electrode adapted for use with a fuel cell system in accordance with an embodiment of the present invention In this example, the processing steps consist of (1) the anode fabrication steps, and (2) the cathode fabrication steps. Without limitation, the principal processing steps are set forth below.

ANODE FABRICATION—Start with a silicon substrate having the following characteristics: 400 μm double side polished, (100) crystal orientation, 0.005 to 0.10 Ω-cm, n-type, 100 mm diameter, and process in accordance with the following steps:

1.1 Deposit a 5000 Å+/–5% layer of silicon dioxide (dielectric) on the front and backside of the silicon substrate via wet thermal oxidation.

1.2 Deposit 600 Å+/–5% of silicon nitride (dielectric) on the front and backside of the silicon substrate via LPCVD nitride deposition.

1.3 Deposit photoresist patterned from Mask A1-1F on the front side of the silicon substrate—the openings only expose the fuel and oxidant inlet/outlets, the dicing lanes, and the flow channels.

1.4 RIE both dielectrics on the front side of the silicon substrate.

1.5 Strip the photoresists from the front side of the silicon substrate.

1.6 Deposit photoresist patterned from Mask A1-2B on the backside of the silicon substrate—the openings only expose the fuel and oxidant inlet/outlets, the dicing lanes, and the flow channels.

1.7 RIE both dielectrics from the backside of the silicon substrate.

1.8 Strip photoresist from the backside of the silicon substrate.

1.9 KOH etch 150 μm from the front and backside of the silicon substrate—carve out the fuel and oxidant inlet/outlets, the dicing lanes, and the flow channels.

1.10 Sputter 200 Å of Ti—W followed by an additional 5000 Å of Au on the front side of the silicon substrate—for the anodic etching Ohmic contact.

1.11 Deposit photoresist patterned from Mask A1-3B on the backside of the silicon substrate—the openings only expose the fuel and oxidant inlet/outlets, the dicing lanes, and the "active" regions to anodic etching.

1.12 Anodic etch the silicon substrate—creating a 200 $\mu$m porous silicon layer.

1.13 Deposit photoresist patterned from Masks A1-4B on the backside of the silicon substrate—the openings only expose the fuel and oxidant inlet/outlets and the dicing lanes.

1.14 KOH etch out the porous silicon on the inlet/outlet plus electrical channels from the backside of the silicon substrate (quickly)—remove the porous silicon within the fuel and oxidant inlet/outlets and the dicing lanes.

1.15 Strip photoresist from the backside of the silicon substrate.

1.16 Remove the Ohmic contact for anodic etching from the front side of the silicon substrate.

1.17 Deposit photoresist patterned from Mask A1-1F (reused) on the front side of the silicon substrate—the openings only expose the fuel and oxidant inlet/outlets, the dicing lanes, and the flow channels.

1.18 RIE the remaining silicon material within the fuel and oxidant inlet/outlets and the dicing lanes from the front side of the silicon substrate.

1.19 Strip photoresist from the front side of the silicon wafer.

1.20 Selectively diffusion dope the porous silicon with phosphorous—to make the porous silicon conductive, approximately 50 m$\Omega$cm.

1.21 Deposit photoresist patterned from Mask A1-5F on the front side of the silicon substrate—the openings only expose the area for the electrical contacts between the porous silicon and the dicing lanes.

1.22 RIE both dielectrics from the front side of the silicon substrate.

1.23 Strip photoresists from the front side of the silicon substrate.

1.24 Sputter 200 Å Ti—W followed by an additional 4,800 Å Au on the front side of the silicon substrate—for the electrical contacts between the porous silicon and the dicing lanes.

1.25 Deposit photoresist patterned from Mask A1-6F on the front side of the silicon substrate—the photoresist covers the sputtered metal located on the front side of the substrate for negative metal lift off.

1.26 Etch Au and Etch Ti—W from the front side of the silicon substrate.

1.27 Strip the photoresists from the front side of the silicon substrate.

1.28 Remove the silicon nitride via RIE on both the front and backside of the silicon substrate.

1.29 Evaporate 500 Å of Ti—W followed by 2 $\mu$m of Au onto the backside of the silicon substrate.

1.30 Catalyst Deposition & Preparation:(a) Heat the silicon substrate to 200° C. in air for 2 hours; (b) After the silicon substrate has cooled to RT, place silicon wafer in an aqueous ammonia solution of tetraamineplatinum (II) hydroxide hydrate, $[Pt(NH_3)_4](OH)_2$—$xH_2O$, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate); (c) Remove the silicon wafer from the aqueous ammonia solution and dry in vacuo for 1 hour; (d) Heat silicon substrate under a flow of oxygen/nitrogen (20:80) from RT to 400° C. at a rate of 2° C. per minute, approximately 3 hours, and then hold at 400° C. for 1 hour; (e) After the silicon wafer has cooled to RT, placed silicon wafer in an aqueous ammonia solution of hexamineruthenium(III) chloride, $[Ru(NH_3)_6]Cl_3$, at pH 8.5 and stir for 10 hours. The solution will contain enough ruthenium complex to deposit a maximum of 1.5% weight ruthenium on silicon, i. e., a 100 mg wafer will be placed in a bath containing 1.5 mg ruthenium (4.6 mg hexamineruthenium(III) chloride); (f) Remove the silicon wafer from the aqueous ammonia solution and dry in vacuo for 1 hour; (g) Heat silicon substrate under a flow of oxygen/nitrogen (20:80) from RT to 400° C. at a rate of 2° C. per minute, approximately 3 hours, and then hold at 400° C. for 1 hour; (h) Heat the silicon wafer under flowing hydrogen. The temperature should be rapidly increased from RT to 400° C. at a rate of 25° C. per minute, approximately 15 minutes, and held at 400° C. for 4 hours.

CATHODE FABRICATION—Start with a silicon substrate having the following characteristics: 400 $\mu$m double side polished, (100) crystal orientation, to 1.0 $\Omega$cm, n-type, 100 mm diameter, and process in accordance with the following steps:

2.1 Deposit a 1000 Å+/−5% layer of Stoichiometric silicon nitride on the front and backside of the silicon substrate via LPCVD nitride deposition.

2.2 Deposit photoresist patterned from mask C1-1B on the backside of the silicon substrate—to initially open inlet and outlet ports.

2.3 REI silicon nitride on the silicon substrate backside.

2.4 Isotropic or DRIE of 60-micron depth cavities from the backside of the silicon substrate—for the fuel and oxidant inlet/outlets and dicing lanes.

2.5 Strip the photoresists off the backside of the silicon substrate.

2.6 Remove all nitride on the backside of the silicon substrate by RIE (this fabrication step can be disregarded depending on stacking requirements).

2.7 Sputter or evaporate 1 $\mu$m of aluminum on the backside of the silicon substrate—the aluminum will serve as an Ohmic contact for anodic etching.

2.8 Deposit photoresist patterned from Mask C1-2F on the front side of the silicon substrate—to open regions on the substrate for porous silicon etching.

2.9 RIE silicon nitride on the silicon substrate front side.

2.10 Strip the photoresists from the front side of the silicon substrate.

2.11 Anodic etch the silicon substrate—creating 50 $\mu$m porous silicon layer.

2.12 Strip off aluminum contact from the backside of the silicon substrate.

2.13 Selectively dope the porous silicon with phosphorus—to make the porous silicon conductive, approximately 50 m$\Omega$-cm.

2.14 Anneal substrate to in $N_2$—to drive in dopant and relieve stress inside the silicon substrate.

2.15 Sputter or evaporate 1 to 3 $\mu$m of aluminum on the front side of the silicon substrate—the aluminum serves as a thermal conductive layer for DRIE.

2.16 Deposit photoresists patterned from mask C1-3B on the backside of the silicon substrate—to initially open inlet, outlet ports and porous silicon for DRIE, AZ4620, 12 µm.

2.17 Deep Reactive Ion Etching on the backside of the silicon substrate—anisotropic etching i.e., Bosch Etch.

2.18 Strip the photoresists off the backside of the silicon substrate.

2.19 Strip off aluminum contact from the front side of the silicon substrate.

2.20 Remove silicon nitride from the front side of the silicon substrate via RIE.

2.21 Sputter a seed layer of palladium on the front side of the silicon substrate—to be used to electroplate palladium for MeOH blocker.

2.22 Deposit photoresists patterned from mask C1-4F on the front side of the silicon substrate—to selectively deposit the palladium-blocking layer.

2.23 Pulse plate palladium as a MeOH blocking layer.

2.24 Strip the photoresist off the front side of the silicon substrate.

2.25 Deposit photoresists patterned from mask C1-5F on the front side of the silicon substrate and deposit photoresists to cover backside of the silicon substrate—to remove excess seed layer.

2.26 Remove excess palladium seed layer by chemical etch technique 2.27 Strip the photoresists off the front side and backside of the silicon substrate.

2.28 Catalyst deposition and preparation:(a) Heat the silicon substrate to 200° C. in air for 2 hours; (b) After the silicon substrate has cooled to RT, place silicon wafer in an aqueous ammonia solution of tetraamineplatinum(II) hydroxide hydrate, $[Pt(NH_3)_4](OH)_2$—$xH_2O$, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate); (c) Remove the silicon wafer from the aqueous ammonia solution and dry in vacuo for 1 hour; (d) Heat silicon substrate under a flow of oxygen/nitrogen (20:80) from RT to 400° C. at a rate of 2° C. per minute, approximately 3 hours, and then hold at 400° C. for 1 hour; (e) Heat the silicon wafer under flowing 1% $H_2$ in $N_2$. The temperature should be rapidly increased from RT to 400° C. at a rate of 25° C. per minute, approximately 15 minutes, and held at 400° C. for 4 hours.

Example 2

Sol-Gel Derived Electrode Structures

This example discloses the processing steps associated with making a sol-gel-based electrode assembly adapted for use with a fuel cell system. In this example, the processing steps consist essentially of (1) the anode fabrication steps, and (2) the cathode fabrication steps.

ANODE FABRICATION—Start with a silicon substrate having the following characteristics: (100) crystal orientation, 1 to 100 Ω-cm, n-type, 100 mm diameter, 300 +/−2 µm double side polished prime (DSPP), TTV<1 µm, and process in accordance with the following steps:

1.1 Grow 5000 Å, both sides of wet thermal oxide ($SiO_2$) on both sides of wafer. Deposit 600 Å, stoichiometric LPCVD silicon ($Si_3N_4$) on both sides of wafer.

1.2 Spin on AZ 1512 photoresist.

1.3 Expose with Photomask A2-1 F-KOH1 for front side.

1.4 RIE dielectrics on front side.

1.5 Strip photoresist and clean wafer.

1.6 KOH etch 100 µm in stirred 28% KOH, at 75° C.

1.7 Grow 3000 Å wet thermal oxide, ($SiO_2$) on exposed Si regions.

1.8 Deposit 600 Å of silicon nitride, $Si_3N_4$.

1.9 Spin on AZ4620 photoresist on front side.

1.10 Expose with photo mask A2-2F-KOH2 for front side, which opens the front side patterns for active region for sol-gel.

1.11 RIE dielectrics down to bare Si on front side using $CHF_3$ and $O_2$. Strip photoresist and clean wafer.

1.12 KOH etch 100 µm in stirred 28% KOH, at 75° C.

1.13 Use photo mask A2-3F-PSPAD on front side, with AZ4620, for conductive strip.

1.14 RIE dielectrics 500 µm in width using $CHF_3$ and $O_2$ on front side to make PS strip.

1.15 Use photo mask A2-4B-OHMIC on back side with photoresist AZ1518 to create openings for ohmic contact for anodic etching.

1.16 RIE dielectrics on back side to bare Si using $CHF_3$ and $O_2$. Then strip photoresist and clean wafer.

1.17 Evaporate 1 µm Al on backside for anodic etching ohmic contact.

1.18 Anodic etch 50 µm (PS etch for macropores) in active region where sol-gel will be cast.

1.19 Wet etch Al.

1.20 Cast sol-gel precursor solution.

1.21 Heat treat at 120° C. for 24 hours, pyrolyze at 450° C. for 4 hours under flowing $H_2$.

1.22 Evaporate 1 µm Al on backside as an RIE mask.

1.23 Use photo mask A2-5B-RIE1 on back side with photoresist AZ4620, to create offset right feed port.

1.24 Wet etch Al at port area on back side.

1.25 RIE dielectrics using $CHF_3$ and $O_2$ on back side at port opening.

1.26 RIE 100 µm Si on backside at port opening using $SF_6$.

1.27 Strip photoresist and clean wafer.

1.28 Use photo mask A2-6B-DRIE on back side, with photoresist AZ4620, for DRIE shield.

1.29 Wet etch Al at port area on back side.

1.30 RIE dielectrics using $CHF_3$ and $O_2$ at port area on back side.

1.31 DRIE to the dielectric interface on the front side.

1.32 Strip photoresist and clean wafer.

1.33 Use photo mask A2-7B-RIE2 with AZ4620 on the back side to expose Si for etching.

1.34 Wet etch Al.

1.35 RIE Si using $CHF_3$ and $O_2$ until porous silicon is reached, which is approximately 50 µm.

1.36 Strip photoresist and clean wafer.

1.37 Wet etch all Al.

1.38 Use photo mask A2-8B-LIFTOFF1 on the back side with AZ4620, to provide conductive layer and bonding interface.

1.39 RIE all of back side nitride ($Si_3N_4$) using $CHF_3$ and $O_2$.

1.40 Evaporate Ti adhesion layer for successive Au layer on the back side.

1.41 Evaporate 2 μm of Au on back side.

1.42 Ti—Au lift-off using acetone.

1.43 Use photo mask A2-9F-LIFTOFF2 on the front side with AZ4620, to provide conductive layer and bonding interface.

1.44 RE dielectrics on front side using $CHF_3$ and $O_2$.

1.45 REE dielectrics on front side.

1.46 Evaporate Ti adhesion layer for successive Au layer on front side.

1.47 Evaporate 2 μm of Au on front side.

1.48 Front side Ti—A side Ti—Au lift-off using acetone.

CATHODE FABRICATION—Start with a silicon substrate having the following characteristics: 300 μm double side polished, (100) crystal orientation, 1 to 1.0 Ω-cm, n-type, 100 mm (4") diameter, and process in accordance with the following steps:

2.1 Nitride Deposition—1000 Å, S1 (front side) and S2 (back side).

2.2 Photo Mask C2_IF_PS for front side, S1, using photoresist AZ1512.

2.3 Photo Mask C2_2B_OHMIC for backside, S2, using photoresist AZ1512 .

2.4 RIE nitride both front and backside.

2.5 Strip photo resists and clean wafer.

2.6 Evaporate 1 μm of Al on backside, S2.

2.7 Isotropic etch: HF: $HNO_3$:$CH_3COOH$, etch out 200 μm Si.

2.8 Anodic etch 50 μm porous structure on front side.

2.9 Cast sol-gel precursor solution.

2.10 Heat treat at 120° C. for 24 hours.

2.11 Pyrolyze at 500° C. for 4 hours under flowing $H_2$.

2.12 Spin on photoresist on front side, S1, using photoresist AZ4620.

2.13 Photo mask C2_3B_OFFSET, S2, using photoresist AZ4620.

2.14 Etch Al.

2.15 RIE 100 μm with $SF_6$.

2.16 Photo Mask C2_4B_DRIE, S2, using photoresist AZ4620.

2.17 DRIE 200 μm.

2.18 Strip photoresist on both sides, S1 and S2.

2.19 Strip Al.

2.20 RIE nitride front side, S1.

2.21 Sputter Pd 2000 Å on the front side, S1.

2.22 Photo Mask C2_5F_PLATING.

2.23 Pulse plate Pd thin film.

2.24 Strip Photoresist and clean wafer.

2.25 Photo Mask C2_6F_PDETCH.

2.26 Etch Pd.

2.27 RIE dielectrics on backside (if required for bonding).

2.28 Sputter external electrical connections on backside (if required for bonding) and (a) sputter 500 angstrom TiW and (b) Sputter 2 μm Au for metal connects.

While the hydrodynamic fluid transport and flow channel passageways of the present invention have been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

We claim:

1. A fluid delivery and removal channel passage structure integrally associated with an electrode structure of a fuel cell system, comprising:

a fluid delivery channel disposed across a first face of the electrode structure;

a fluid removal channel disposed across a second face of the electrode structure, wherein the second face opposes the first face; and a porous bulk matrix fluid transport layer interposed between the fluid delivery channel and the fluid removal channel, wherein the porous bulk matrix fluid transport layer is adapted to hydrodynamically flow a gas or liquid therethrough, wherein the porous bulk matrix fluid transport layer is in fluid communication with the fluid delivery and the fluid removal channels, and wherein the porous bulk matrix fluid transport layer comprises a sol-gel.

2. A fluid delivery and removal channel passage structure associated with an electrode structure of a fuel cell system, characterized in that the fluid delivery and removal passage structure comprises an inlet passage and an outlet passage separated by a porous bulk matrix fluid transport layer, wherein the porous bulk matrix fluid transport layer is adapted to hydrodynamically flow a gas or liquid therethrough, wherein the porous bulk matrix fluid transport layer is in fluid communication with the inlet passage and the outlet passage, and wherein porous bulk matrix fluid transport layer comprises a sol-gel.

3. A fuel cell system comprising:

an anode derived from a first planar silicon substrate;

a cathode derived from a second planar silicon substrate;

and a liquid electrolyte that ionically connects the anode to the cathode;

wherein the anode and the cathode are spaced apart and substantially parallel to each other so as to define a spaced apart region, wherein the liquid electrolyte is interposed between the anode and the cathode and within the spaced apart region, wherein the anode has a plurality of anodic porous regions, wherein the plurality of anodic porous regions each comprise a plurality of interconnected mesoporous anodic pores, and wherein the plurality of interconnected mesoporous anodic pores are acicular and substantially parallel to one another.

4. A fuel cell system comprising:

an anode derived from a first planar silicon substrate;

a cathode derived from a second planar silicon substrate;

and a liquid electrolyte that ionically connects the anode to the cathode;

wherein the anode and the cathode are spaced apart and substantially parallel to each other so as to define a spaced apart region, wherein the liquid electrolyte is interposed between the anode and the cathode and within the spaced apart region, wherein the cathode has a plurality of cathodic porous regions, wherein the plurality of cathodic porous regions each comprise a plurality of interconnected mesoporous cathodic pores, and wherein the plurality of interconnected cathodic mesoporous pores are acicular and substantially parallel to one another.

* * * * *